US010655406B2

(12) United States Patent
Hande et al.

(10) Patent No.: US 10,655,406 B2
(45) Date of Patent: May 19, 2020

(54) HORIZONTAL CONNECTION SYSTEM FOR SUBSEA HUB CONNECTIONS

(71) Applicant: VETCO GRAY SCANDINAVIA AS, Sandvika (NO)

(72) Inventors: Olav Hande, Asker (NO); Rolf Bastesen, Vinterbro (NO); Odd Marius Rosvold, Jar (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 0 days.

(21) Appl. No.: 16/094,573

(22) PCT Filed: Apr. 18, 2017

(86) PCT No.: PCT/EP2017/059191
§ 371 (c)(1),
(2) Date: Oct. 18, 2018

(87) PCT Pub. No.: WO2017/182470
PCT Pub. Date: Oct. 26, 2017

(65) Prior Publication Data
US 2019/0100971 A1      Apr. 4, 2019

(30) Foreign Application Priority Data

Apr. 21, 2016  (NO) .................................. 20160679

(51) Int. Cl.
*E21B 17/04*      (2006.01)
*E21B 19/00*      (2006.01)
(Continued)

(52) U.S. Cl.
CPC ............ *E21B 19/002* (2013.01); *E21B 17/04* (2013.01); *E21B 19/16* (2013.01); *E21B 36/003* (2013.01);
(Continued)

(58) Field of Classification Search
CPC ........ E21B 17/04; E21B 19/002; E21B 19/16; E21B 36/003; E21B 36/005; E21B 43/013; F16L 1/26; F16L 53/32
See application file for complete search history.

(56) References Cited

U.S. PATENT DOCUMENTS 6,889,770 B2 * 5/2005 Qvam ................... E21B 36/003
166/356
7,784,547 B2 * 8/2010 Reddy ................... E21B 36/003
137/375

(Continued)

FOREIGN PATENT DOCUMENTS

| WO | 0163088 W | 8/2001 |
|---|---|---|
| WO | 2011034438 A1 | 3/2011 |
| WO | 2012152875 A1 | 11/2012 |

*Primary Examiner* — Matthew R Buck
(74) *Attorney, Agent, or Firm* — Baker Hughes Patent Organization (57) ABSTRACT

A horizontal connection system including: a first holding unit, to which a first hub is fixed; a second holding unit, to which a second hub is fixed; a heat bank including a casing with a rear part secured to the first holding unit and a front part releasably connectable to the rear part; and a clamp connector secured to the first holding unit and received inside the heat bank. The parts of the casing are temporarily fixed to each other by connecting members extending between the parts on the outside thereof. The front part of the casing is provided with fastening members configured to come into engagement with associated fastening members on the second holding unit, to thereby allow the front part to be secured to the second holding unit, when the front part and the second holding unit are brought into contact with each other.

15 Claims, 6 Drawing Sheets

(51) Int. Cl.
*E21B 19/16* (2006.01)
*E21B 36/00* (2006.01)
*E21B 43/013* (2006.01)
*F16L 1/26* (2006.01)
*F16L 53/32* (2018.01)

(52) U.S. Cl.
CPC .......... *E21B 36/005* (2013.01); *E21B 43/013* (2013.01); *F16L 1/26* (2013.01); *F16L 53/32* (2018.01)

(56) References Cited

U.S. PATENT DOCUMENTS

| | | | |
|---|---|---|---|
| 8,875,364 B2 * | 11/2014 | Bekkevold | F16L 1/26 29/237 |
| 8,919,450 B1 * | 12/2014 | Cruz | E21B 41/0007 166/338 |
| 2009/0090500 A1 | 4/2009 | Damsleth | |
| 2014/0290902 A1 | 10/2014 | Hånde | |

* cited by examiner

HORIZONTAL CONNECTION SYSTEM FOR SUBSEA HUB CONNECTIONS

FIELD OF THE INVENTION

Embodiments of the present invention relate to a horizontal connection system according to the preamble of claim 1 for subsea connection of a first hub arranged at an end of a first tubular member to a second hub arranged at an end of a second tubular member. Embodiments of the invention also relate to a method for subsea connection of two hubs to each other by means of such a connection system.

In connection with oil and gas producing installations it is well known that rapid cooling of the production fluid during normal production and particularly during a temporary interruption of the production may result in the formation of hydrates, which may cause clogging of pipes and pipe connections. The cooling is caused by the ambient cold sea water. To delay cooling of the production fluid in case of an interruption of the production, some form of thermal insulation and heat storage medium has to be provided to the element through which the production fluid flows. WO 01/63088 A1 and WO 2006/106406 A1 disclose the use of a so-called heat bank for thermally insulating an element included in a subsea installation. The heat bank comprises a casing, which is arranged to enclose a fluid having heat-storing capacity, for instance water, and which has an internal space for receiving said element and said fluid with the fluid surrounding the element so as to allow the fluid to delay cooling of the element by means of heat stored in the fluid. The casing and the fluid enclosed therein form a thermal barrier between said element and the ambient sea water on the outside of the casing. By means of heat stored in the fluid inside the casing, the heat bank protects the element from cooling too rapidly. The fluid in the heat bank is heated by heat emitted from the protected element during normal operation. This heat emanates from the production fluid flowing through the element. If the heat input to the protected element from the production fluid is decreased or interrupted for some reason, the heat stored in the fluid inside the casing will slow down the cooling of the protected element caused by the ambient cold sea water on the outside of the casing.

A horizontal connection system may for instance be used for subsea connection of a spool piece hub to a pipeline hub, wherein the spool piece hub is fixed to a first holding unit which forms part of a spool piece termination assembly and the pipeline hub is fixed a second holding unit which forms part of a pipeline termination assembly. In one known type of such a horizontal connection system, the spool piece termination assembly is configured to be connectable to the pipeline termination assembly by being lowered downwards onto a landing structure of the pipeline termination assembly so as to come to bear against it, whereupon the first holding unit is to be displaced in relation to the second holding unit so as to allow the spool piece hub to be displaced towards the pipeline hub in order to bring said hubs into contact with each other. A clamp connector, which has been fixed to the first holding unit before the spool piece termination assembly is lowered into the sea, may then be actuated in order to secure the spool piece hub and the pipeline hub to each other. In cold environments, it might be necessary to thermally insulate the clamp connector from ambient cold sea water so as to thereby protect the hubs from too rapid cooling. It is previously known to achieve this by enclosing the clamp connector in a heat bank of the above-mentioned type. In the latter case, the casing of the heat bank may be divided into two parts, a first part which is mounted to the holding unit of the pipeline termination assembly before the pipeline termination assembly is lowered into the sea and a second part which is mounted to the holding unit of the spool piece termination assembly before the spool piece termination assembly is lowered into the sea. The two parts of the heat bank casing will be connected to each other when the spool piece termination assembly has been landed onto the landing structure of the pipeline termination assembly and the first holding unit is displaced towards the second holding unit in order to bring the hubs into contact with each other. However, this previously known solution can not be used with a pipeline termination assembly of the type shown in U.S. Pat. No. 7,503,727 B2 where a pipeline end section is mounted to the pipeline termination assembly subsea by lowering the pipeline end section into an upwardly open seat of a holding unit included in the pipeline termination assembly.

SUMMARY OF THE INVENTION

The object of embodiments of the present invention is to provide a solution to the above-mentioned problem and make it possible to mount a part of a heat bank casing to a holding unit of a subsea structure in a simple manner subsea after the installation of the subsea structure on the seabed.

According to embodiments of the invention, this object is achieved by a horizontal connection system having the features defined in claim 1.

The horizontal connection system of embodiments of the present invention comprises:
a first holding unit, wherein a first hub is fixed to this first holding unit;
a second holding unit, wherein a second hub is fixed to this second holding unit;
a clamp connector for connecting and securing the first hub to the second hub, the clamp connector being secured to the first holding unit; and
a heat bank for thermally insulating the clamp connector from ambient cold sea water, the heat bank comprising a casing which encloses an internal fluid chamber, wherein this fluid chamber is configured to accommodate a fluid having heat-storing capacity, more particularly sea water, and wherein the clamp connector is to be received in the fluid chamber with the fluid surrounding the clamp connector.

The casing of the heat bank comprises a rear part which is secured to the first holding unit and a front part which is releasably connectable to the rear part, wherein the front part of the casing is configured to be temporarily fixed to the rear part of the casing by means of connecting members extending between the front part and the rear part on the outside thereof. The front part of the casing is provided with fastening members which are configured to come into engagement with associated fastening members on the second holding unit, to thereby allow the front part to be secured to the second holding unit, when the front part and the second holding unit are brought into contact with each other by an axial movement of the front part towards the second holding unit together with the rear part of the casing and the first holding unit or by an axial movement of the second holding unit towards the front part of the casing. Hereby, it will be possible to mount both parts of the heat bank casing to a first holding unit of a spool piece termination assembly before the spool piece termination assembly is lowered into the sea, wherein the two parts of the casing may be kept temporarily connected to each other by means of the above-mentioned connecting members during the lowering of the spool piece termination assembly onto a landing structure of a pipeline termination assembly. The casing may then be moved, together with the first holding unit, forwards into contact with a second holding unit of the pipeline termination assembly so as to allow the fastening members on the front part of the casing to come into engagement with the associated fastening members on the second holding unit, whereupon the connecting members between the two parts of the heat bank casing may be cut or released in order to allow the front part of the casing to remain attached to the second holding unit when the first holding unit and the rear part of the casing subsequently are moved horizontally backwards away from the second holding unit in order to gain access to the hubs and/or the clamp connector inside the heat bank casing. Thus, the technical solution according to embodiments of the present invention makes it possible, in a simple manner, to effect subsea mounting of the front part of the heat bank casing to a holding unit of a pipeline termination assembly previously installed at the seabed, at the same time as the accessibility to the hubs and the clamp connector inside the heat bank casing is ensured at the subsea installation site. This technical solution is fully compatible with a pipeline termination assembly of the type shown in U.S. Pat. No. 7,503,727 B2.

Further advantages as well as advantageous features of the horizontal connection system according to embodiments of the present invention will appear from the dependent claims and the following description.

Embodiments of the invention also relate to a method having the features defined in claim 15 for subsea connection of two hubs to each other by means of the above-mentioned connection system.

BRIEF DESCRIPTION OF THE DRAWINGS

With reference to the appended drawings, a specific description of preferred embodiments of the invention cited as examples follows below. In the drawings.

DETAILED DESCRIPTION

Figure 1:
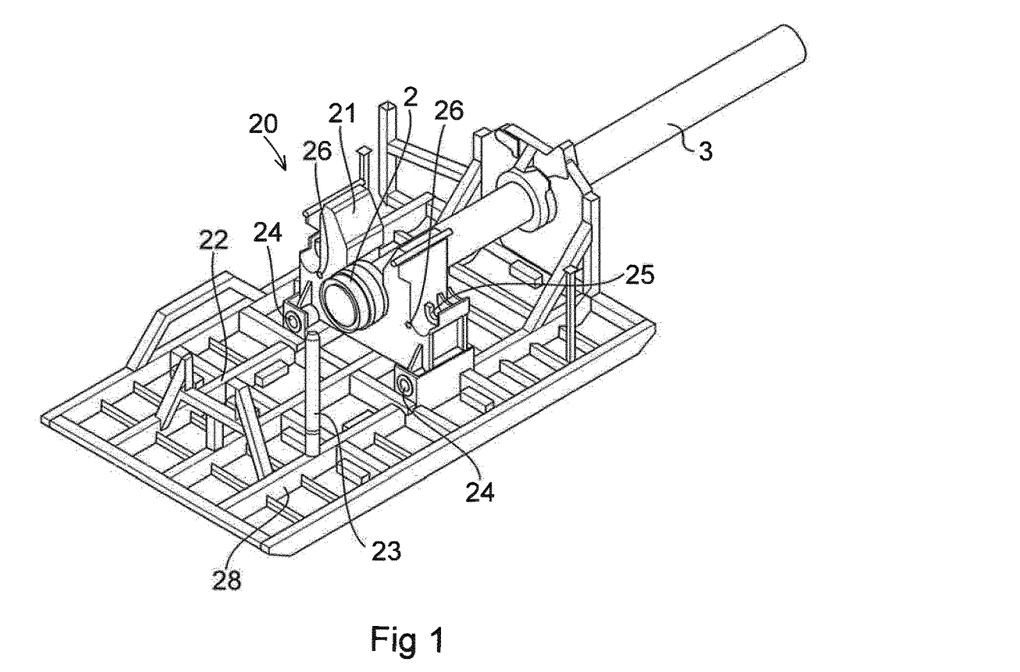
FIG. 1 is a perspective view of a pipeline termination assembly included in a horizontal connection system.
Figure 13:
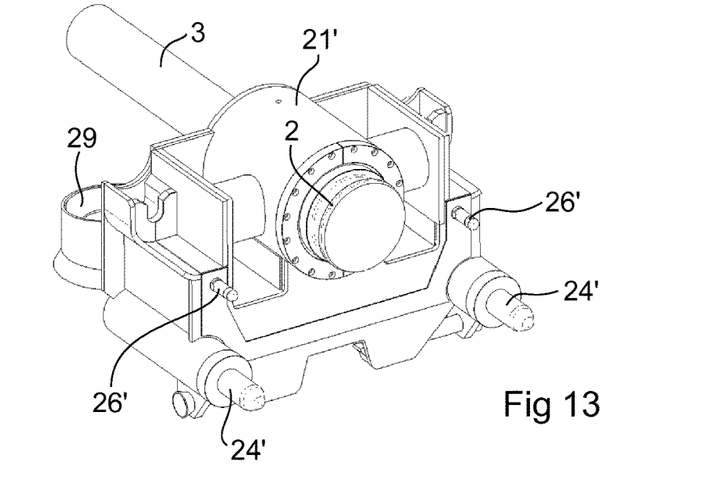
FIG. 13 is a perspective view of the second holding unit of FIGS. 11 and 12.

Different parts of a horizontal connection system according to two different embodiments of the present invention are illustrated in FIGS. 1-10 and FIGS. 11-15. The horizontal connection system is designed for subsea connection of a first hub 1 (see FIG. 2) arranged at an end of a first tubular member (not shown) to a second hub 2 (see FIGS. 1 and 13) arranged at an end of a second tubular member 3. The first hub 1 is fixed to a first holding unit 11, 11' of the horizontal connection system and the second hub 2 is fixed to a second holding unit 21, 21' of the horizontal connection system.

The horizontal connection system further comprises a clamp connector 30 (see FIGS. 2 and 3) for connecting and securing the first hub 1 to the second hub 2. The clamp connector has been omitted in FIGS. 11 and 12. The clamp connector 30 is secured to the first holding unit 11, 11'. In the example illustrated in FIGS. 2 and 3, the clamp connector 30 comprises three arc-shaped clamping elements 31a, 31b, 31c which are configured to clamp together the first hub 1 with the second hub 2 in order to form a pressure-tight connection between the first and second tubular members. The clamping elements 31a, 31b, 31c may be designed and operated in a conventional manner well known to a person skilled in the art. A space for receiving the hubs to be connected to each other is formed between the clamping elements 31a, 31b, 31c. Two of the clamping elements, in the following denominated first and second clamping elements 31a, 31b, have a hinged first end and an opposite second end. An operating shaft (not shown) is connected to the first and second clamping elements 31a, 31b, the operating shaft being configured to be operated by means of a remotely operated actuating tool (not shown) in order to move said second ends of the first and second clamping elements 31a, 31b towards each other and thereby move the clamping elements 31a, 31b, 31c into engagement with the first and second hubs 1, 2. The operating shaft is for instance an externally threaded shaft which is in threaded engagement with an internally threaded first trunnion member (not shown) pivotally mounted to the first clamping element 31a at said second end thereof and with an internally threaded second trunnion member (not shown) pivotally mounted to the second clamping element 31b at said second end thereof. In this case, the actuating tool is a torque tool configured to rotate the operating shaft about its longitudinal axis in a first direction in order to pivot the first and second clamping elements 31a, 31b towards the hubs 1, 2 and in the opposite direction in order to pivot the first and second clamping elements 31a, 31b away from the hubs. The actuating tool may be detachably mounted to a torque bucket 32 on the clamp connector 30 by means of an ROV or a diver.

Figure 2:
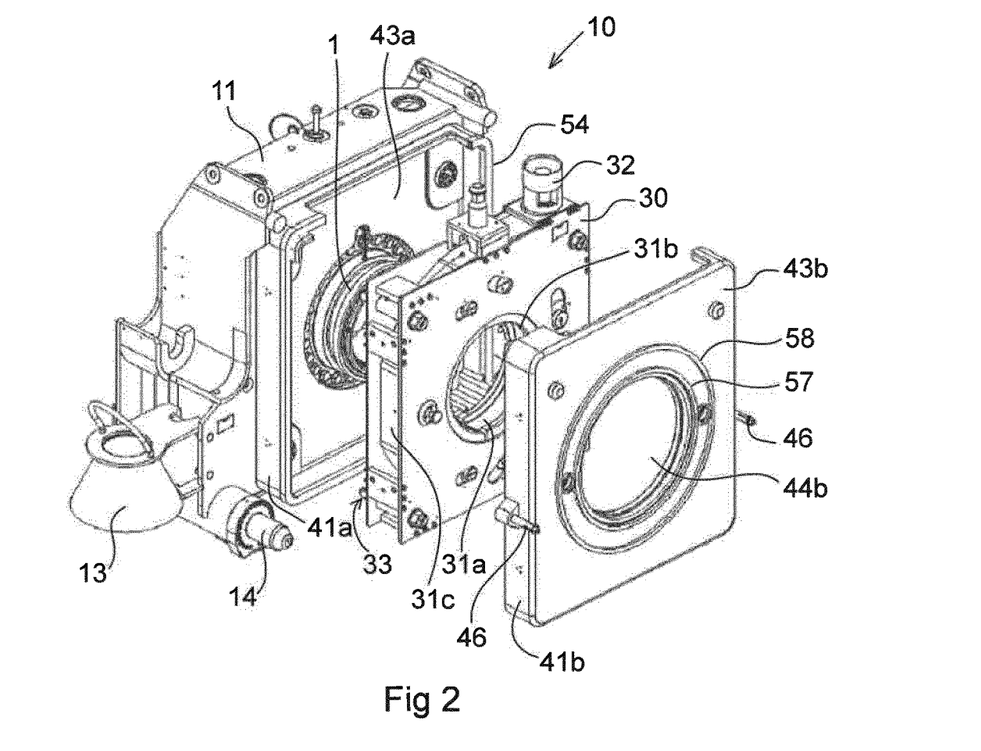
FIG. 2 is a perspective view of a spool piece termination assembly, a clamp connector and a heat bank casing included in said horizontal connection system.
Figure 3:
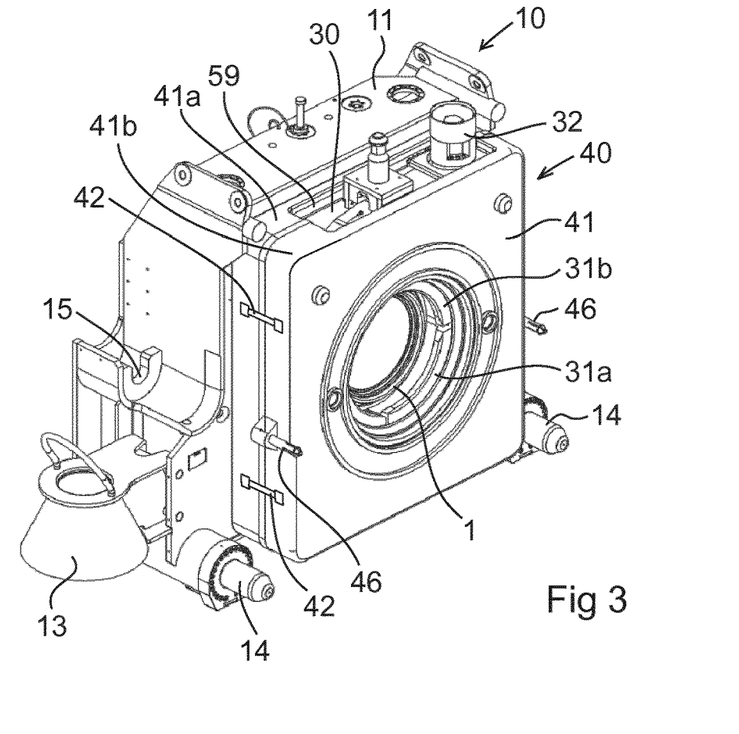
FIG. 3 is a perspective view of the spool piece termination assembly of FIG. 2, as seen with the clamp connector and the heat bank casing mounted to the spool piece termination assembly.

Each clamping element 31a, 31b, 31c has opposed bevelled wedging surfaces for engaging corresponding bevelled wedging surfaces provided on the first and second hubs 1, 2. The clamping elements 31a, 31b, 31c are moveable between an open position and a closed position under the effect of the operating shaft. In the closed position, the wedging surfaces of the clamping elements 31a, 31b, 31c are in engagement with the corresponding wedging surfaces of the hubs 1, 2 and thereby keep the hubs tightly clamped to each other. In the open position, the clamping elements 31a, 31b, 31c do not exert any clamping action on the first and second hubs 1, 2 and provide a sufficient free space between each other to allow the second hub 2 to be moved into and out of the space between the clamping elements 31a, 31b, 31c.

The horizontal connection system further comprises a heat bank 40 for thermally insulating the clamp connector 30 from ambient cold sea water. The heat bank 40 comprises a casing 41 which encloses an internal fluid chamber, wherein this fluid chamber is configured to accommodate a fluid having heat-storing capacity, more particularly sea water. The horizontal connection system is to be installed subsea with some of the outer surfaces of the casing 41 exposed to ambient sea water. The heat-storing fluid is enclosed by the casing 41 and thereby separated from the ambient sea water by the casing 41. The clamp connector 30 is to be received in the fluid chamber with the heat-storing fluid surrounding the clamp connector so as to allow the fluid to delay cooling of the clamp connector 30 and the first and second hubs 1, 2 by means of heat stored in the fluid. Hereby, the fluid inside the casing 41 of the heat bank 40 will protect the hubs 1, 2 from being too rapidly cooled down in case of a shutdown.

The tubular members which are secured to each other by means of the clamp connector 30 could for instance constitute parts of a subsea piping system for processing or transporting oil and/or gas. During normal operation, production fluid will flow through the tubular members, and the heat-storing fluid accommodated in the internal fluid chamber of the heat bank 40 will receive and store heat emitted from the production fluid. The casing 41 of the heat bank 40 and the fluid enclosed therein form a thermal barrier between the clamp connector 30 and the ambient sea water on the outside of the casing 41.

The casing 41 of the heat bank 40 comprises a rear part 41a which is secured to the first holding unit 11, 11' and a front part 41b which is releasably connectable to the rear part 41a. The rear and front parts 41a, 41b of the casing 41 are, in an embodiment, of thermally insulating material and/or lined or coated with one or more layers of thermally insulating material. The front part 41b of the casing 41 is configured to be temporarily fixed to the rear part 41a of the casing by means of connecting members 42, 42'. The connecting members 42, 42' extend between the front part 41b and the rear part 41a of the casing on the outside thereof and are thereby accessible on the outside of the casing 41 so as to allow the connecting members 42, 42' to be cut or released by means of a tool handled by an ROV (ROV=Remotely Operated Vehicle) or a diver when the rear and front parts 41a, 41b of the casing 41 are to be released from each other.

The connecting members 42 may for instance have the form of straps, more particularly of plastic material, as illustrated in FIGS. 3-8. In this case, the connecting members 42 may be cut by means of a cutting tool 4 of the type illustrated in FIG. 8 when the rear and front parts 41a, 41b of the casing 41 are to be released from each other. As an alternative, the connecting members 42 may have the form of wires. In the embodiment illustrated in FIGS. 11-15, each connecting member 42' has the form of a pin, which projects forwards from the rear part 41a of the casing and which is configured to be received in an associated recess 53 (see FIG. 15) on the front part 41b of the casing. Each pin-shaped connecting member 42' is associated with a locking member 70, which is rotatably mounted to the front part 41b of the casing so as to be rotatable between a first position (see FIG. 15), in which the locking member 70 keeps the connecting member 42' locked inside the associated recess 53 on the front part 41b of the casing, and a second position, in which the locking member 70 allows the connecting member 42' to be moved out of the associated recess 53 on the front part 41b of the casing. In the illustrated example, the locking member 70 has the form of an elongated rod, which is rotatably mounted on the outside of the front part 41b of the casing and rotatable for instance by means of an ROV (not shown).

The rear part 41a of the casing 41 comprises a rear wall 43a which is provided with a central opening 44a configured to receive the first hub 1. The front part 41b of the casing 41 comprises a front wall 43b which is provided with a central opening 44b configured to receive the second hub 2. The clamp connector 30 is secured to the first holding unit 11 by means of fastening members 33 (see FIG. 2) which extend between the clamp connector 30 and the first holding unit 11 through holes 45 (see FIG. 5) in the rear wall 43a of the rear part 41a of the casing 41, wherein the rear wall 43a is clamped between the clamp connector 30 and the first holding unit 11 to thereby keep the rear part 41a of the casing 41 fixed to the first holding unit 11.

The front part 41b of the casing 41 is provided with fastening members 46, 46' which are configured to come into engagement with associated fastening members 26, 26' on the second holding unit 21, 21' in order to allow the front part 41b to be secured to the second holding unit 21, 21' when the front part 41b and the second holding unit 21, 21' are brought into contact with each other by an axial movement of the front part 41b towards the second holding unit 21 together with the rear part 41a of the casing and the first holding unit 11 or by an axial movement of the second holding unit 21' towards the front part 41b of the casing.

In the embodiment illustrated in FIGS. 1-10, the front part 41b of the casing 41 is provided with fastening members 46 (see FIGS. 2, 3, 5, 6 and 9) which are configured to snap into locking engagement with associated fastening members 26 (see FIGS. 1 and 10) on the second holding unit 21 when the front part 41b and the second holding unit 21 are brought into contact with each other. The front part 41b of the casing 41 may thereby be secured to the second holding unit 21 by being moved horizontally forwards into contact with the second holding unit 21. Each one of said fastening members 46 on the front part 41b of the casing comprises a locking shoulder 47 (see FIG. 9) which is configured to snap into locking engagement with a corresponding shoulder 27 (see FIG. 10) provided on the associated fastening member 26 on the second holding unit 21. In the illustrated embodiment, each one of said fastening members 46 on the front part 41b of the casing has the form of a pin, more particularly of plastic material, which projects horizontally forwards from the front part 41b and which is provided with said locking shoulder 47 at its outer end, wherein each pin-shaped fastening member 46 has a beveled tip 48 at its outer end and wherein said locking shoulder 47 is arranged at an inner end of the beveled tip 48. In the illustrated example, each one of the pin-shaped fastening members 46 comprises an elongated base part 49 and three or more fingers 50 which are connected to the base part 49 and extend axially forwards from a front end of the base part. The fingers 50 are evenly distributed about a centre axis of the associated fastening member 46 and separated from each other by slits 51. The fingers 50 are provided with beveled heads 52 at their outer ends, wherein these beveled heads 52 together form the beveled tip 48 of the fastening member 46.

In the embodiment illustrated in FIGS. 1-10, each one of said fastening members 26 on the second holding unit 21 has the form of a recess with a shoulder 27 configured for engagement with the locking shoulder 47 on the associated pin-shaped fastening member 46 on the front part 41b of the casing 41. In this case, the shoulder 27 of the fastening member 26 on the second holding unit 21 is formed by the rim of said recess.

The fastening members 26, 46 may of course also have any other suitable configuration as long as they are capable of providing the above-mentioned snap fit engagement.

In the embodiment illustrated in FIGS. 11-15, each one of said fastening members 46' on the front part 41b of the casing 41 has the form of a recess and each one of said fastening members 26' on the second holding unit 21' has the form of a pin, which projects horizontally forwards from the second holding unit 21' and which is configured to be received in the associated fastening member 46' when the front part 41b and the second holding unit 21' are brought into contact with each other. Each pin-shaped fastening member 26' is configured to be locked inside the associated fastening member 46' by means one of the above-mentioned locking members 70, wherein the locking member 70 is configured to keep the pin-shaped fastening member 26' locked inside the associated fastening member 46' when the locking member 70 has been rotated into the above-mentioned second position.

At least one sealing member 54 (see FIG. 2) is arranged at the interface between the rear and front parts 41a, 41b of the casing 41 in order to form a fluid-tight connection between these parts. Furthermore, sealing members 55, 56 (see FIG. 5) are arranged on the outer side of the rear wall 43a around the central opening 44a and the holes 45 in this wall. Sealing members 57, 58 (see FIG. 2) are also arranged on the outer side of the front wall 43b around the central opening 44b in this wall.

The clamp connector 30 is accessible through an access opening 59 (see FIG. 3) provided in the casing 41 of the heat bank 40 at the interface between the rear part 41a and front part 41b of the casing 41 to thereby allow the above-mentioned actuating tool to be mounted to the torque bucket 32 of the clamp connector 30 in order to move the clamping elements 31a, 31b from the open position to the closed position when the first and second hubs 1, 2 are to be secured to each other or from the closed position to the open position when the first and second hubs 1, 2 are to be released from each other. The heat bank 40 comprises a cover 60 (see FIG. 4) which is releasably connectable to the casing 41 in order to cover and sealingly close the access opening 59. In the illustrated embodiment, the torque bucket 32 is received in an inner space of the cover 60 when the cover is secured to the casing 41 of the heat bank 40. The cover 60 is to be secured to the casing 41 after a subsea connection of the first and second hubs 1, 2 to each other and sea water will thereby be entrapped inside the casing 41 and prevented from being exchanged with ambient sea water on the outside of the casing.

The first hub 1, the clamp connector 30 and the casing 41 of the heat bank are to be mounted to the first holding unit 11, 11' before a lowering of the first holding unit 11, 11' into the sea from a surface vessel. Thus, the first hub 1, the clamp connector 30 and the casing 41 of the heat bank are mounted to the first holding unit 11, 11' before the performance of a connecting operation.

The first holding unit 11, 11' and the second holding unit 21, 21' are provided with corresponding alignment members 14, 14', 24, 24' which are designed to come into contact with each other when the first holding unit 11, 11' is displaced towards the second holding unit 21, 21', or when the second holding unit 21, 21' is displaced towards the first holding unit 11, 11', so as to properly align the first hub 1 in relation to the second hub 2. In the embodiment illustrated in FIGS. 1-10, the first holding unit 11 is provided with two pin-shaped alignment members 14 configured for engagement with tubular alignment members 24 on the second holding unit 21. In the embodiment illustrated in FIGS. 11-15, the second holding unit 21' is provided with two pin-shaped alignment members 24' configured for engagement with tubular alignment members 14' on the first holding unit 11'.

In the embodiment illustrated in FIGS. 1-10, the first hub 1 is a spool piece hub and the second hub 2 is a pipeline hub. In this case, the horizontal connection system comprises a spool piece termination assembly 10 (see FIGS. 2-4) and a pipeline termination assembly 20 (see FIG. 1), wherein the first holding unit 11 forms part of the spool piece termination assembly 10 and the second holding unit 21 forms part of the pipeline termination assembly 20. The pipeline termination assembly 20 comprises a landing structure 22, which is configured to support the spool piece termination assembly 10 when the spool piece termination assembly has been landed onto the pipeline termination assembly 20. The spool piece termination assembly 10 is connectable to the pipeline termination assembly 20 by being lowered downwards onto the landing structure 22 so as to come to bear against it, as will be described in closer detail below. Furthermore, the first holding unit 11 is displaceable in relation to the second holding unit 21 when the spool piece termination assembly 10 has come to bear against the landing structure 22 so as to allow the first hub 1 to be displaced towards the second hub 2 in order to bring the hubs into contact with each other.

Figure 4:
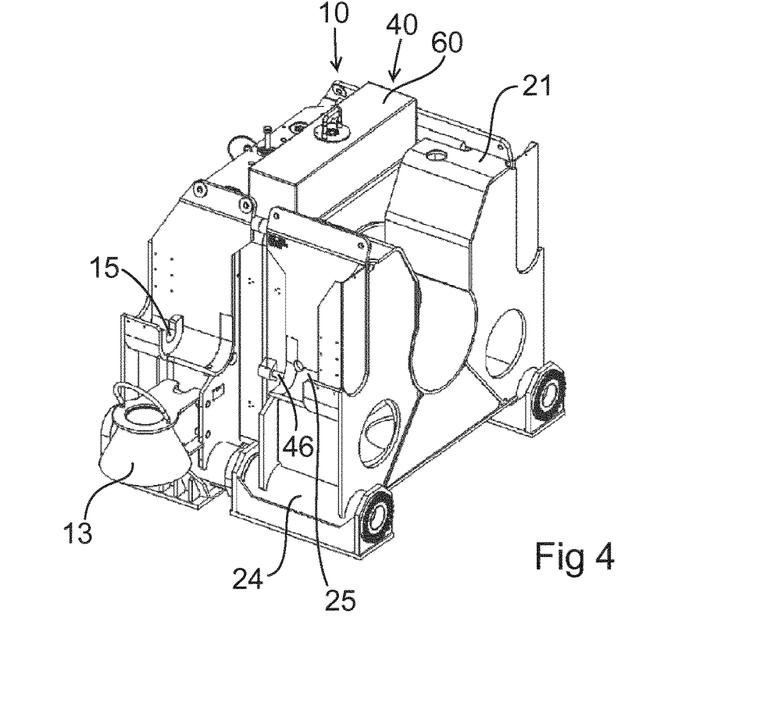
FIG. 4 is a perspective view of the spool piece termination assembly and heat bank casing of FIG. 3, as seen with the heat bank casing clamped between a holding unit of the spool piece termination assembly and a holding unit of the pipeline termination assembly and with a cover mounted to the heat bank casing.
Figure 5:
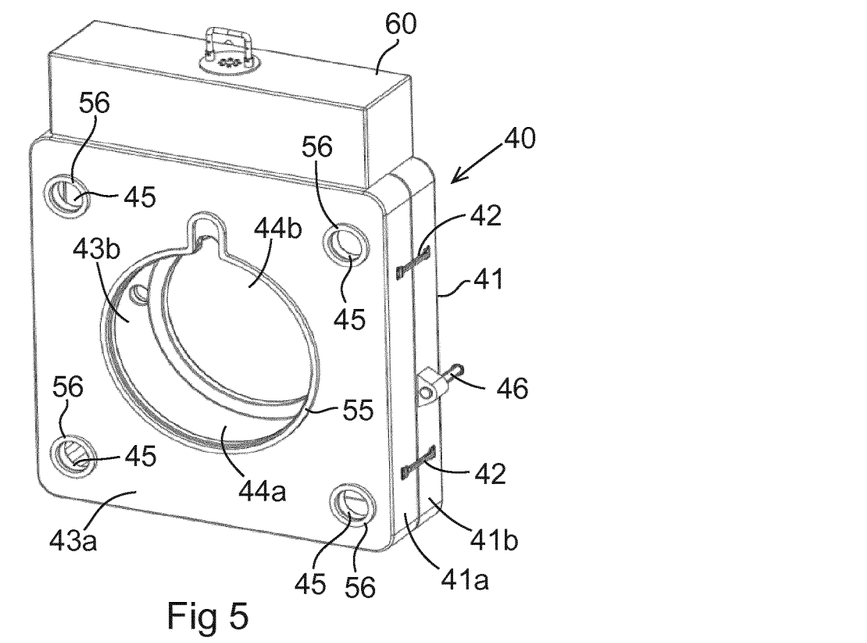
FIG. 5 is a perspective view of a heat bank included in the horizontal connection system of FIGS. 1-4.
Figure 6:
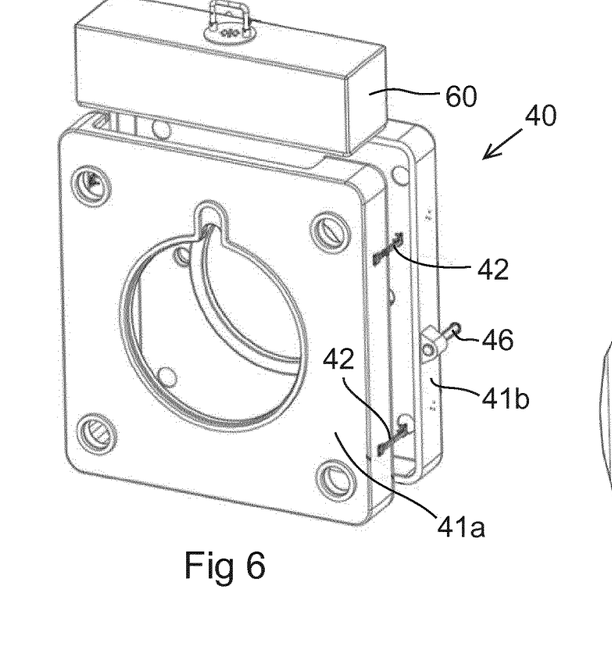
FIG. 6 is an exploded view of the heat bank of FIG. 5.
Figure 7:
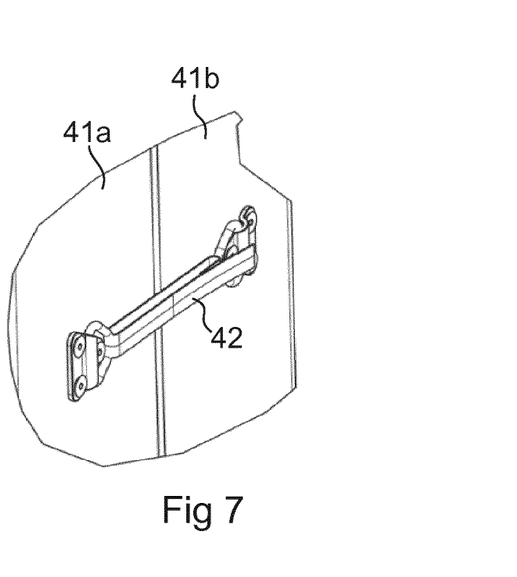
FIG. 7 is a perspective view in closer detail of a connecting member included in the heat bank of FIG. 5.
Figure 8:
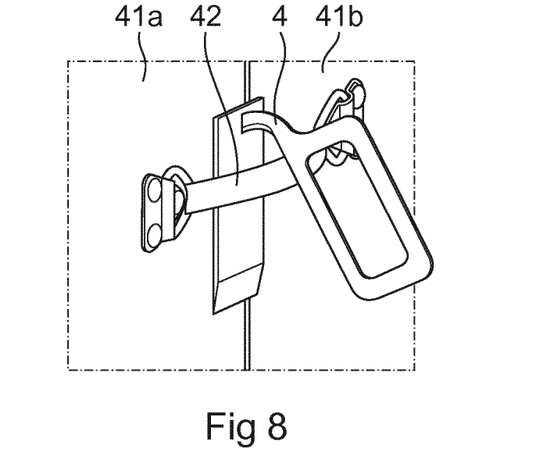
FIG. 8 is a perspective view of the connecting member of FIG. 7 and a cutting tool for cutting the connecting member.
Figure 9:
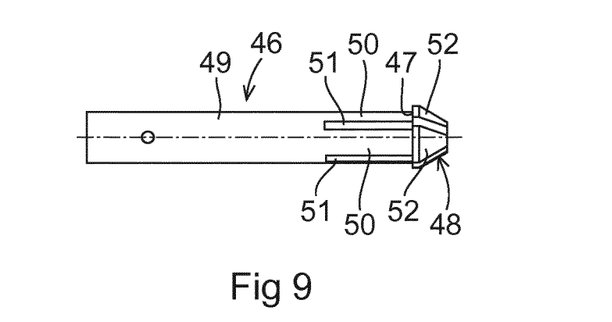
FIG. 9 is a lateral view of a fastening member included in the heat bank of FIG. 5.
Figure 10:
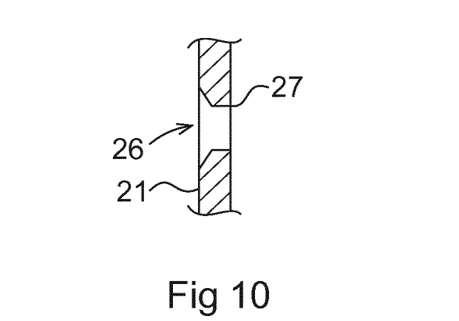
FIG. 10 is a schematic sectional view of a fastening member configured for engagement with the fastening member of FIG. 9, FIGS. 11 and 12 are perspective views of first and second holding units and a heat bank included in a horizontal connection system.
Figure 11:
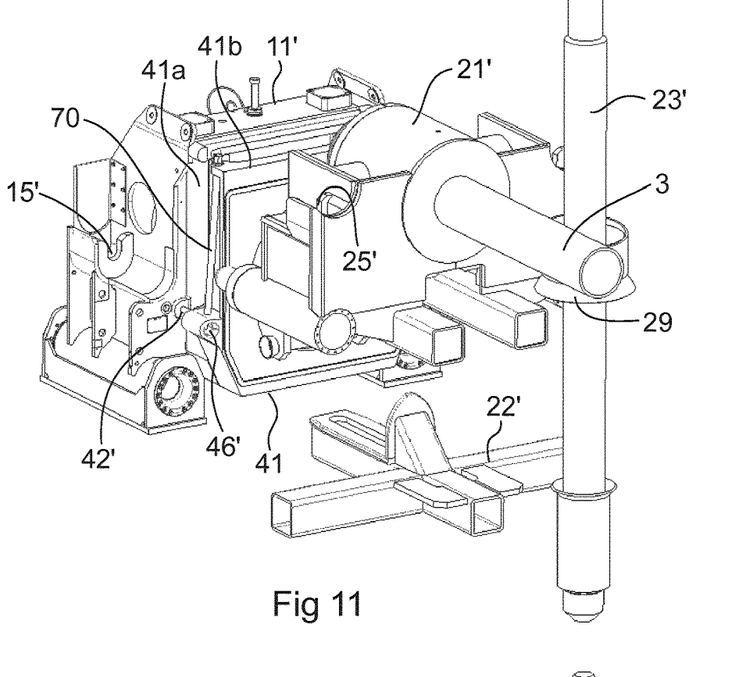
Figure 12:
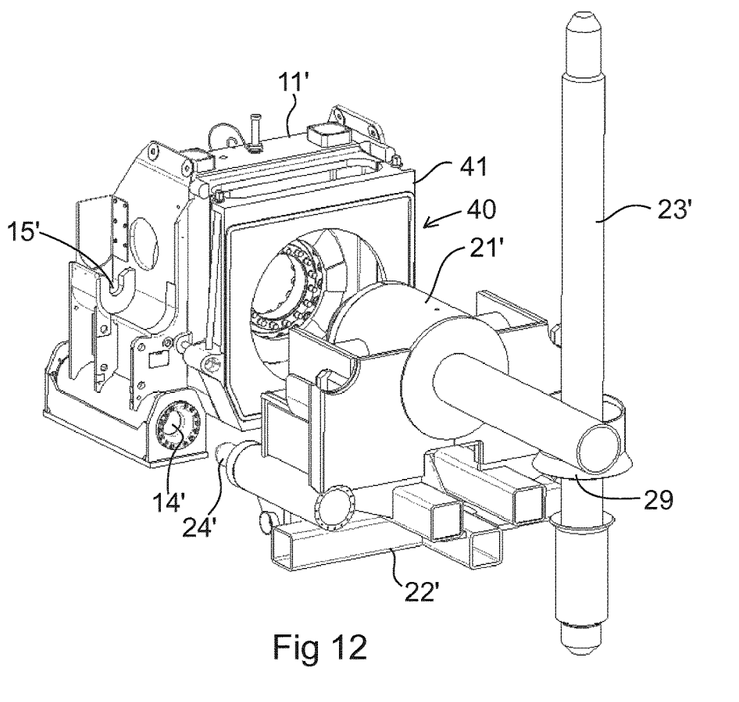

The spool piece termination assembly 10 illustrated in FIGS. 3 and 4 is provided with a guiding member 13 in the form of a guide funnel, which is designed to engage with a corresponding guide post 23 on a base frame 28 of the pipeline termination assembly 20 when the spool piece termination assembly 10 is lowered into engagement with the pipeline termination assembly so as to make sure that the spool piece termination assembly 10 is properly received and positioned on the pipeline termination assembly 20.

The first holding unit 11 is configured to be displaced in relation to the second holding unit 21 by means of an actuating device (not shown) which is provided with force applying means, more particularly in the form of hydraulic cylinders, for displacing the first and second holding units 11, 21 in relation to each other. In the illustrated embodiment, the first and second holding units 11, 21 are both provided with slots 15, 25 for docketing of hydraulic cylinders of the actuating device to the holding units. The actuating device is, in an embodiment, designed as a separate unit that is lowered downwards into engagement with the first and second holding units 11, 21 after the positioning of the spool piece termination assembly 10 onto the pipeline termination assembly 20.

When the horizontal connection system according to the embodiment illustrated in FIGS. 1-10 is to be put into operation, the second tubular member 3 is first mounted to the pipeline termination assembly 20 in the manner described in closer detail in U.S. Pat. No. 7,503,727 B2. Thereafter, the spool piece termination assembly 10 is together with the first tubular member, the clamp connector 30 and the heat bank casing 41 lowered into the sea, e.g.

from a surface vessel, and lowered downwards onto the landing structure 22 of the pipeline termination assembly 20 so as to come to bear against the landing structure, wherein the front part 41b of the casing 41 is kept in engagement with the rear part 41a of the casing by the connecting members 42. The first holding unit 11 is hereby positioned in front of the second holding unit 21 with the first hub 1 in coarse alignment with the second hub 2. A guide line attached to the guide post 23 of the pipeline termination assembly 20 may assist the guiding to ensure capture of the guide funnel 13 of the spool piece termination assembly 10 over the guide post 23. However, the use of a guide line is optional and the guide funnel 13 may be lowered into engagement with the guide post 23 also without the use of a guide line. A connecting device (not shown) comprising a pair of stroking cylinders is then lowered downwards into contact with the first and second holding units 11, 21. The stroking cylinders of the connecting device are connected to the first and second holding units 11, 21 via the docketing slots 15, 25 arranged therein. The stroking cylinders are then actuated to displace the first holding unit 11 and thereby the clamp connector 30 and the first hub 1 towards the second hub 2 mounted to the second holding unit 21. The first holding unit 11 is moved horizontally forwards towards the second holding unit 21 until the fastening members 46 on the front part 41b of the casing 41 snap into locking engagement with the associated fastening members 26 on the second holding unit 21 to thereby secure the front part 41b of the casing to the second holding unit 21. The connecting members 42 are then cut by means of a cutting tool 4 or released in order to allow the front part 41b of the casing 41 to be separated from the rear part 41a of the casing, whereupon the stroking cylinders are actuated to move the first holding unit 11 horizontally backwards away from the second holding unit 21 in order to separate the rear part 41a of the casing 41 from the front part 41b of the casing and gain access to the first and second hubs 1, 2. When the rear part 41a of the casing 41 is moved backwards together with the first holding unit 11, the front part 41b of the casing 41 will remain in its present position fixed to the second holding unit 21. The first and second hubs 1, 2 may now be subjected to cleaning and other operations in order to be made ready for final connection to each other. Thereafter, the stroking cylinders are again actuated to move the first holding unit 11 horizontally forwards towards the second holding unit 21 until the first hub 1 makes contact with the second hub 2 and the rear part 41a of the casing 41 makes contact with the front part 41b of the casing, whereupon the clamp connector 30 is operated by means of the above-mentioned actuating tool in order to secure the first and second hubs 1, 2 to each other by clamping and at the same time secure the rear and front parts 41a, 41b of the casing 41 to each other. The rear and front parts 41a, 41b of the casing 41 are maintained in engagement with each other under the effect of the clamp connector 30 as long as the clamp connector 30 keeps the first and second hubs 1, 2 clamped to each other. When so needed later on, the actuating tool may be operated in order to release the first and second hubs 1, 2 from each other and at the same time release the rear and front parts 41a, 41b of the casing 41 from each other.

Figure 14:
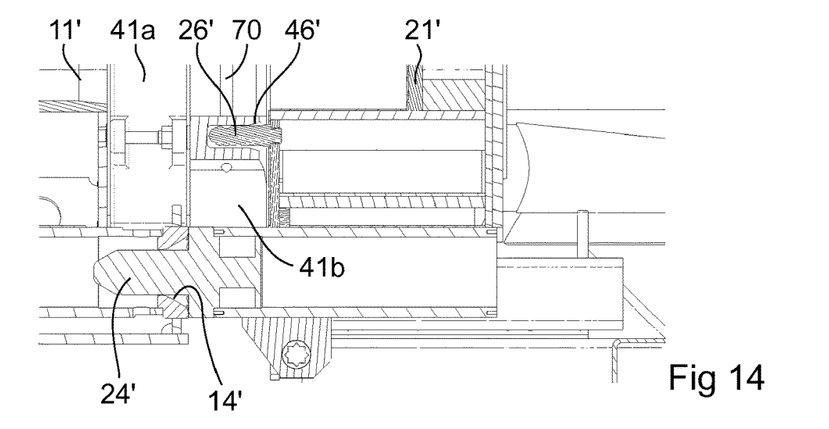
FIG. 14 is a vertical section through the first and second holding units and the heat bank of FIGS. 11 and 12.
Figure 15:
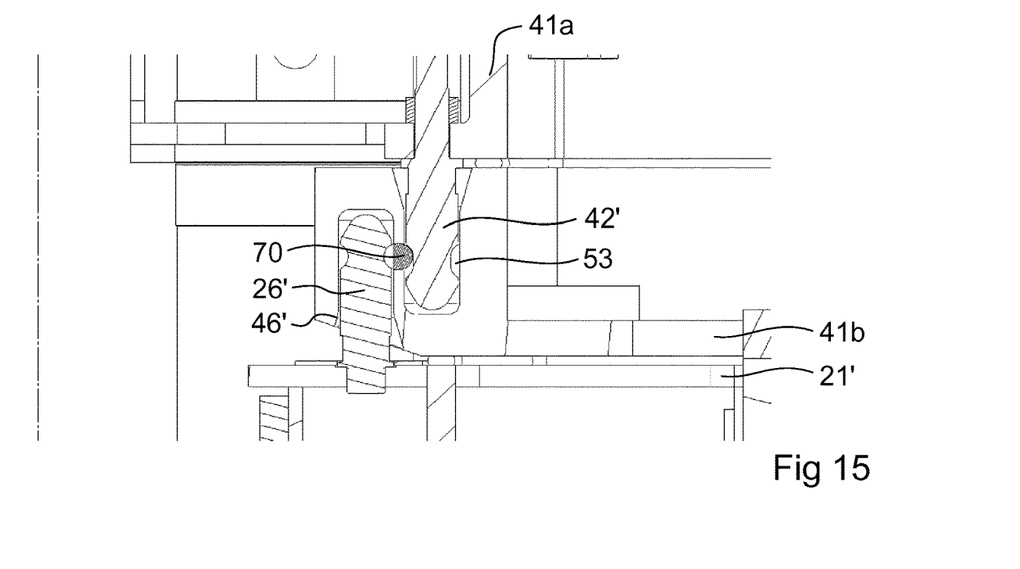
FIG. 15 is a horizontal section through the first and second holding units and the heat bank of FIGS. 11 and 12.

When it comes to the embodiment illustrated in FIGS. 11-15, the first holding unit 11' is together with the first tubular member, the clamp connector and the heat bank casing 41 installed at the seabed in a first step, wherein the front part 41b of the casing 41 is kept in engagement with the rear part 41a of the casing by the connecting members 42'. In a subsequent step, the second holding unit 21' is lowered into the sea, e.g. from a surface vessel, and lowered downwards onto a landing structure 22' so as to come to bear against the landing structure. The second holding unit 21' is hereby positioned in front of the first holding unit 11' with the second hub 2 in coarse alignment with the first hub. A guide line attached to a guide post 23' on the landing structure 22' may assist the guiding to ensure capture of a guide funnel 29 on the second holding unit 21' over the guide post 23'. However, the use of a guide line is optional and the guide funnel 29 may be lowered into engagement with the guide post 23' also without the use of a guide line. A connecting device (not shown) comprising a pair of stroking cylinders is then lowered downwards into contact with the first and second holding units 11', 21'. The stroking cylinders of the connecting device are connected to the first and second holding units 11', 21' via docketing slots 15', 25' arranged therein. The stroking cylinders are then actuated to displace the second holding unit 21' towards the first holding unit 11'. The second holding unit 21' is moved horizontally forwards towards the first holding unit 11' until the fastening members 26' on the second holding unit 21' have been received in the associated fastening members 46' on the front part 41b of the casing 41, as illustrated in FIG. 14, whereupon each locking member 70 is rotated 180° from the above-mentioned first position to the above-mentioned second position for instance by means of an ROV, in order to release the pin-shaped connecting members 42' and thereby allow the front part 41b of the casing 41 to be separated from the rear part 41a of the casing, at the same time as the fastening members 26' on the second holding unit 21' are locked to the associated fastening member 46' on the front part 41b of the casing by means of the locking member 70 so as to thereby secure the front part 41b of the casing to the second holding unit 21'. The stroking cylinders are then actuated to move the second holding unit 21' horizontally backwards away from the first holding unit 11' in order to separate the front part 41b of the casing 41 from the rear part 41a of the casing and gain access to the first and second hubs. When the front part 41b of the casing 41 is moved backwards together with the second holding unit 21', the rear part 41a of the casing 41 will remain in its present position fixed to the first holding unit 11'. The first and second hubs may now be subjected to cleaning and other operations in order to be made ready for final connection to each other. Thereafter, the stroking cylinders are again actuated to move the second holding unit 21' horizontally forwards towards the first holding unit 11' until the second hub 2 makes contact with the first hub and the front part 41b of the casing 41 makes contact with the rear part 41a of the casing, whereupon the clamp connector is operated by means of the above-mentioned actuating tool in order to secure the first and second hubs to each other by clamping and at the same time secure the rear and front parts 41a, 41b of the casing 41 to each other. The rear and front parts 41a, 41b of the casing 41 are maintained in engagement with each other under the effect of the clamp connector as long as the clamp connector keeps the first and second hubs clamped to each other. When so needed later on, the actuating tool may be operated in order to release the first and second hubs from each other and at the same time release the rear and front parts 41a, 41b of the casing 41 from each other.

Embodiments of the invention are of course not in any way restricted to the embodiments described above. On the contrary, many possibilities to modifications thereof will be apparent to a person with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A horizontal connection system for subsea connection of a first hub arranged at an end of a first tubular member to a second hub arranged at an end of a second tubular member, the horizontal connection system comprising:
   a first holding unit, wherein the first hub is fixed to the first holding unit;
   a second holding unit, wherein the second hub is fixed to the second holding unit;
   a clamp connector for connecting and securing the first hub to the second hub, the clamp connector being secured to the first holding unit; and
   a heat bank for thermally insulating the clamp connector from ambient cold sea water, the heat bank comprising a casing which encloses an internal fluid chamber, wherein the fluid chamber is configured to accommodate a fluid having heat-storing capacity, and wherein the clamp connector is to be received in the fluid chamber with the fluid surrounding the clamp connector, the casing comprising a rear part which is secured to the first holding unit and a front part which is releasably connectable to the rear part,
   wherein:
   the front part of the casing is configured to be temporarily fixed to the rear part of the casing by connecting members extending between the front part and the rear part on the outside thereof;
   the front part of the casing is provided with fastening members which are configured to come into engagement with associated fastening members on the second holding unit, to thereby allow the front part to be secured to the second holding unit, when the front part and the second holding unit are brought into contact with each other by an axial movement of the front part towards the second holding unit together with the rear part of the casing and the first holding unit or by an axial movement of the second holding unit towards the front part of the casing; and
   the fastening members on the front part of the casing snap into locking engagement with the associated fastening members on the second holding unit when the front part and the second holding unit are brought into contact with each other.

2. The horizontal connection system according to claim 1, wherein each one of the fastening members on the front part of the casing comprises a locking shoulder which is configured to snap into locking engagement with a corresponding shoulder provided on the associated fastening member on the second holding unit when the front part and the second holding unit are brought into contact with each other.

3. The horizontal connection system according to claim 2, wherein each one of the fastening members on the front part of the casing has the form of a pin which projects forward from the front part and is provided with the locking shoulder at an outer end of the pin.

4. The horizontal connection system according to claim 3, wherein each one of the pin-shaped fastening members has a beveled tip at the outer end, wherein the locking shoulder is arranged at an inner end of the beveled tip.

5. The horizontal connection system according to claim 4, wherein each one of the pin-shaped fastening members comprises an elongated base part and three or more fingers which are connected to the base part and extend axially forwards from a front end of the base part, the fingers being separated from each other by slits and provided with beveled heads at outer ends of the fingers, wherein the beveled heads together form the beveled tip.

6. The horizontal connection system according to claim 1, wherein the connecting members have the form of straps.

7. The horizontal connection system according to claim 1, wherein:
   the rear part of the casing comprises a rear wall which is provided with a central opening configured to receive the first hub; and
   the front part of the casing comprises a front wall which is provided with a central opening configured to receive the second hub.

8. The horizontal connection system according to claim 7, wherein:
   the clamp connector is secured to the first holding unit by fastening members extending between the clamp connector and the first holding unit through holes in the rear wall of the rear part of the casing; and
   the rear part of the casing is secured to the first holding unit by being clamped between the clamp connector and the first holding unit.

9. The horizontal connection system according to claim 1, wherein the rear and front parts of the casing are of thermally insulating material and/or lined or coated with one or more layers of thermally insulating material.

10. The horizontal connection system according to claim 1, wherein the first hub is a spool piece hub and the second hub is a pipeline hub, wherein:
    the horizontal connection system comprises a spool piece termination assembly and a pipeline termination assembly, wherein the first holding unit forms part of the spool piece termination assembly and the second holding unit forms part of the pipeline termination assembly;
    the pipeline termination assembly comprises a landing structure, which is configured to support the spool piece termination assembly when landed onto the pipeline termination assembly;
    the spool piece termination assembly is configured to be connectable to the pipeline termination assembly by being lowered downwards onto the landing structure so as to come to bear against the landing structure; and
    the first holding unit is configured to be displaceable in relation to the second holding unit when the spool piece termination assembly has come to bear against the landing structure so as to allow the clamp connector and the first hub to be displaced towards the second hub in order to bring the hubs into contact with each other.

11. The horizontal connection system according to claim 1, wherein the fluid is sea water.

12. The horizontal connection system according to claim 3, wherein the pin is of plastic material.

13. A horizontal connection system for subsea connection of a first hub arranged at an end of a first tubular member to a second hub arranged at an end of a second tubular member, the horizontal connection system comprising:

a first holding unit, wherein the first hub is fixed to the first holding unit;

a second holding unit, wherein the second hub is fixed to the second holding unit;

a clamp connector for connecting and securing the first hub to the second hub, the clamp connector being secured to the first holding unit; and a heat bank for thermally insulating the clamp connector from ambient cold sea water, the heat bank comprising a casing which encloses an internal fluid chamber, wherein the fluid chamber is configured to accommodate a fluid having heat-storing capacity, and wherein the clamp connector is to be received in the fluid chamber with the fluid surrounding the clamp connector, the casing comprising a rear part which is secured to the first holding unit and a front part which is releasably connectable to the rear part, wherein:

the front part of the casing is configured to be temporarily fixed to the rear part of the casing by connecting members extending between the front part and the rear part on the outside thereof;

the front part of the casing is provided with fastening members which are configured to come into engagement with associated fastening members on the second holding unit, to thereby allow the front part to be secured to the second holding unit, when the front part and the second holding unit are brought into contact with each other by an axial movement of the front part towards the second holding unit together with the rear part of the casing and the first holding unit or by an axial movement of the second holding unit towards the front part of the casing;

each one of the fastening members on the front part of the casing has the form of a recess, and each one of the fastening members on the second holding unit has the form of a pin which projects forwards from the second holding unit and is configured to be received in the associated fastening member on the front part of the casing when the front part and the second holding unit are brought into contact with each other; and each one of the pin-shaped fastening members is configured to be locked inside the associated fastening member on the front part of the casing by a locking member provided on the front part.

14. The horizontal connection system according to claim 13, wherein:

each one of the connecting members has the form of a pin, which projects forwards from the rear part of the casing and which is configured to be received in an associated recess on the front part of the casing; and each locking member is rotatably mounted to the front part of the casing so as to be rotatable between a first locking position, in which the locking member keeps a connecting member locked inside the associated recess on the front part of the casing, and a second locking position, in which the locking member keeps a pin-shaped fastening member on the second holding unit locked inside the associated fastening member on the front part of the casing and allows the connecting member to be moved out of the associated recess on the front part of the casing.

15. The horizontal connection system according to claim 13, wherein the fluid is sea water.

\* \* \* \* \*